(12) United States Patent
Sato

(10) Patent No.: US 8,105,545 B2
(45) Date of Patent: Jan. 31, 2012

(54) ENGINE EXHAUST GAS PURIFIER

(75) Inventor: Shinya Sato, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 677 days.

(21) Appl. No.: 11/765,271

(22) Filed: Jun. 19, 2007

(65) Prior Publication Data

US 2008/0317643 A1     Dec. 25, 2008

(51) Int. Cl.
*B01D 50/00* (2006.01)
(52) U.S. Cl. ........................................... 422/180
(58) Field of Classification Search ................... 422/177, 422/180
See application file for complete search history.

(56) References Cited

U.S. PATENT DOCUMENTS

| | | | | |
|---|---|---|---|---|
| 6,753,294 | B1 * | 6/2004 | Brisley et al. | 502/439 |
| 6,892,529 | B2 * | 5/2005 | Duvinage et al. | 60/286 |

FOREIGN PATENT DOCUMENTS

| | | |
|---|---|---|
| JP | 04-197422 | 7/1992 |
| JP | 2003-001067 | 1/2003 |
| JP | 2003-184546 | 7/2003 |
| JP | 2004-060494 | 2/2004 |
| JP | 2004-162544 | 6/2004 |
| JP | 2004-239109 | 8/2004 |
| JP | 2004-239109 A | 8/2004 |
| WO | 2005/014146 | 2/2005 |

OTHER PUBLICATIONS

Japanese Office Action issued Nov. 8, 2011, in Japanese Patent Application No. 2005-209343.

* cited by examiner

*Primary Examiner* — Tom Duong
(74) *Attorney, Agent, or Firm* — Kubovcik & Kubovcik

(57) ABSTRACT

A selective reduction catalyst includes a catalyst support in which a plurality of through holes partitioned by porous walls are formed and a first active component carried by the walls which dissolves nitrogen oxide contained in the exhaust gas by the reaction with ammonia. Inlet portions and outlet portions, adjacent to each other, of the plurality of through holes are alternately sealed, and the wall carrying the first active component has ventilation and a second active component having a catalytic action so as to oxidize ammonia having passed the wall is carried on the inner surface of the though hole. An exhaust gas purifier is provided with the selective reduction catalyst, a liquid injection nozzle which is provided on the upstream side and can inject urea liquid, and an oxidation catalyst provided at the exhaust pipe on the upstream side.

2 Claims, 4 Drawing Sheets

ENGINE EXHAUST GAS PURIFIER

BACKGROUND OF THE INVENTION

1. Field of the Invention

The present invention relates to a selective reduction catalyst that dissolves nitrogen oxide contained in an exhaust gas from a diesel engine by the reaction of nitrogen oxide with urea liquid and to an engine exhaust gas purifier using it.

2. Description of the Related Art

As an exhaust gas purifier for reducing nitrogen oxide (hereinafter, referred to as "NOx") contained in an exhaust gas from a diesel engine, there have been known an exhaust gas purifier, wherein a selective reduction catalyst is provided in the middle of an exhaust passage of a diesel engine, and a liquid injection nozzle which can inject urea liquid toward the selective reduction catalyst is provided at an exhaust pipe on the upstream side of the selective reduction catalyst (See Patent Document 1, for example). The conventional selective reduction catalyst comprises a catalyst support having a plurality of through holes formed in parallel with each other and an active component having a catalytic action and carried by partition walls of the catalyst support. And in the conventional diesel-engine exhaust gas purifier provided with this selective reduction catalyst, the urea liquid injected from the liquid injection nozzle is heated by heat of the exhaust gas and hydrolyzed, and ammonia is generated. And the ammonia serves as a reducing agent for purifying NOx in the exhaust gas by the selective reduction catalyst so that the NOx emitted to the atmosphere can be reduced.

On the other hand, in the exhaust purifier provided with the selective reduction catalyst in the middle of the exhaust passage in this way, in order to prevent surplus ammonia from being emitted directly into the atmosphere, an ammonia oxidation catalyst for oxidizing the surplus ammonia is usually provided separately from the selective reduction catalyst at the exhaust passage on the downstream side of the selective reduction catalyst. And the ammonia oxidation catalyst oxides the surplus ammonia that has passed through the selective reduction catalyst, not serving as a reducing agent, so that the ammonia can be prevented from being emitted directly into the atmosphere.

PATENT DOCUMENT 1

Japanese Unexamined Patent Application Publication No. 2004-239109 (paragraph Nos. [0012] to [0015], FIGS. 2 to 4)

SUMMARY OF THE INVENTION

However, if the ammonia oxidation catalyst is provided at the exhaust passage on the downstream side separately from the selective reduction catalyst, the number of catalysts provided at the exhaust passage is increased. Thus, there has occurred a problem that a degree of freedom in design is lost by the increase of the number of parts, the number of processes to install the catalysts is increased due to the increase of the catalysts to be installed, and thereby a unit price is raised.

An object of the present invention is to provide a selective reduction catalyst which can eliminate a need of mounting of an independent ammonia oxidation catalyst to an exhaust passage; and an engine exhaust gas purifier using it.

An invention according to claim 1 is, as shown in FIG. 2, improvement of a selective reduction catalyst comprising a catalyst support 23 in which a plurality of through holes 23b partitioned by porous walls 23a are formed in parallel with each other and a first active component 24 having a catalytic action and carried by the wall 23a, in which nitrogen oxide in an exhaust gas an engine 11 is reacted with ammonia for dissolution.

The characteristic construction lies in that an inlet portion 23c and an outlet portion 23d, adjacent to each other, of the plurality of through holes 23b partitioned by the walls 23a are sealed alternately, the wall 23a carrying the first active component 24 has ventilation and is formed so that the exhaust gas flowing in the inlet portion 23c of a through hole 23b passes through the wall 23a and is emitted from the outlet portion 23d of another through hole 23b adjacent to the through hole 23b, and a second active component 26 having a catalytic action to oxidize ammonia having passed the wall 23a is carried on the inner surface of another through hole 23b.

In the selective reduction catalyst described in claim 1, when the exhaust gas flows into the selective reduction catalyst 22, ammonia serves as a reducing agent at the first active component 24 carried by the catalyst support 23, NO, $N_2$ in the exhaust gas is reduced and changed into $N_2$ or $H_2O$, and the amount of NOx emitted as it is into the atmosphere is reduced. On the other hand, surplus ammonia ($NH_3$) having passed through the wall 23a of the catalyst support 23 without serving as a reducing agent is oxidized by the second active component 26 carried on the inner surface of the through hole 23b after having passed through the wall 23a, so that ammonia is prevented from being emitted as it is into the atmosphere. Since the second active component 26 for oxidizing the surplus ammonia is carried by the catalyst support 23, it is now unnecessary to install the conventional ammonia oxidation catalyst for oxidizing the surplus ammonia on the downstream side of the selective reduction catalyst.

An invention according to a first embodiment is, as shown in FIG. 2, improvement of a selective reduction catalyst comprising a catalyst support 23 in which a plurality of through holes 23b partitioned by porous walls 23a are formed in parallel with each other and a first active component 24 having a catalytic action and carried by the wall 23a, in which nitrogen oxide in an exhaust gas an engine 11 is reacted with ammonia for dissolution.

In the engine exhaust gas purifier described in claim 2, when the urea liquid is injected from the liquid injection nozzle 29, the urea liquid is hydrolyzed and ammonia is generated, so that ammonia serves as a reducing agent for purifying NOx in the exhaust gas by the selective reduction catalyst 22 so as to reduce the amount of NOx emitted into the atmosphere. On the other hand, if a particle-state solid matter such as ammonium nitrate is deposited on the selective reduction catalyst 22, it might clog a fine hole in the wall 23a. However, the temperature of the exhaust gas is raised by oxidation of HC or the like in the exhaust gas in the oxidation catalyst 53 provided at the exhaust pipe 16 on the exhaust-gas upstream side of the selective reduction catalyst 22, the particle-state solid matter such as ammonium nitrate deposited on the selective reduction catalyst 22 is burned, and the selective reduction catalyst 22 is regenerated.

In the selective reduction catalyst described in the first embodiment, when the exhaust gas flows into the selective reduction catalyst 22, ammonia serves as a reducing agent at the first active component 24 carried by the catalyst support 23, NO, $N_2$ in the exhaust gas is reduced and changed into $N_2$ or $H_2O$, and the amount of NOx emitted as it is into the atmosphere is reduced. On the other hand, surplus ammonia ($NH_3$) having passed through the wall 23a of the catalyst support 23 without serving as a reducing agent is oxidized by the second active component 26 carried on the inner surface of the through hole 23b after having passed through the wall 23a, so that ammonia is prevented from being emitted as it is into the atmosphere. Since the second active component 26 for oxidizing the surplus ammonia is carried by the catalyst support 23, it is now unnecessary to install the conventional ammonia oxidation catalyst for oxidizing the surplus ammonia on the downstream side of the selective reduction catalyst.

An invention according to a second embodiment is an engine exhaust gas purifier comprising, as shown in FIG. 1, the selective reduction catalyst 22 provided at the exhaust pipe 16 of the diesel engine 11 as described in claim 1, a liquid injection nozzle 29 which is provided at the exhaust pipe 16 on the exhaust-gas upstream side of the selective reduction catalyst 22 and can inject urea liquid 32 toward the selective reduction catalyst 22, and an oxidation catalyst 53 provided at the exhaust pipe 16 on the exhaust-gas upstream side of the selective reduction catalyst 22.

In the engine exhaust gas purifier described in the second embodiment, when the urea liquid is injected from the liquid injection nozzle 29, the urea liquid is hydrolyzed and ammonia is generated, so that ammonia serves as a reducing agent for purifying NOx in the exhaust gas by the selective reduction catalyst 22 so as to reduce the amount of NOx emitted into the atmosphere. On the other hand, if a particle-state solid matter such as ammonium nitrate is deposited on the selective reduction catalyst 22, it might clog a fine hole in the wall 23a. However, the temperature of the exhaust gas is raised by oxidation of HC or the like in the exhaust gas in the oxidation catalyst 53 provided at the exhaust pipe 16 on the exhaust-gas upstream side of the selective reduction catalyst 22, the particle-state solid matter such as ammonium nitrate deposited on the selective reduction catalyst 22 is burned, and the selective reduction catalyst 22 is regenerated.

An invention according to a third embodiment is an engine exhaust gas purifier comprising, as shown in FIG. 4, the selective reduction catalyst 22 provided at the exhaust pipe 16 of the diesel engine 11 as described in claim 1, the liquid injection nozzle 29 which is provided at the exhaust pipe 16 on the exhaust-gas upstream side of the selective reduction catalyst 22 and can inject the urea liquid 32 toward the selective reduction catalyst 22, a diesel particulate filter 51 provided at the exhaust pipe 16 on the exhaust-gas upstream side of the selective reduction catalyst 22, and a filter temperature raising means configured capable of raising the temperature of the diesel particulate filter 51 to a predetermined value or above.

In the engine exhaust gas purifier described in the third embodiment, particulates in an exhaust gas from the diesel engine 11 is caught by the particulate filter 51, and emission of the particulates to the outside can be effectively prevented. Also, when the urea liquid is injected from the liquid injection nozzle, the urea liquid is hydrolyzed and ammonia is generated, and ammonia serves as a reducing agent for purifying NOx in the exhaust gas by the selective reduction catalyst 22 and can reduce the amount of NOx to be emitted into the atmosphere.

On the other hand, in the engine exhaust gas purifier comprising the selective reduction catalyst, the liquid injection nozzle which is provided at the exhaust pipe on the exhaust-gas upstream side of the selective reduction catalyst and can inject the urea liquid toward the selective reduction catalyst, the diesel particulate filter provided at the exhaust pipe on the exhaust-gas upstream side of the selective reduction catalyst, and the filter temperature raising means configured capable of raising the temperature of the diesel particulate filter to a predetermined value or above, the particulates in the exhaust gas from the diesel engine can be caught by the particulate filter, and emission of the particulate to the outside can be effectively prevented. Also, when the urea liquid is injected from the liquid injection nozzle, the urea liquid is hydrolyzed and ammonia is generated, and ammonia serves as a reducing agent for purifying NOx in the exhaust gas by the selective reduction catalyst, so that the amount of NOx emitted into the atmosphere can be reduced. On the other hand, since ammonium nitrate or the like of a particle-state solid matter might be deposited on the selective reduction catalyst, the selective reduction catalyst needs to be regenerated regularly. However, if the particulates deposited on the diesel particulate filter are burned by raising the temperature of the diesel particulate filter provided at the exhaust pipe on the exhaust-gas upstream side of the selective reduction catalyst so as to raise the temperature of the exhaust gas passing through the diesel particulate filter by burning the particulates and to burn and dissolve ammonium nitrate in the particle-state solid matter deposited on the selective reduction catalyst by heat of the exhaust gas whose temperature has been raised, the particulate filter can be regenerated and the selective reduction catalyst can be also regenerated at the same time.

DETAILED DESCRIPTION OF PREFERRED EMBODIMENTS

Preferred embodiments for carrying out the present invention will be described based on the attached drawings.

Figure 1:
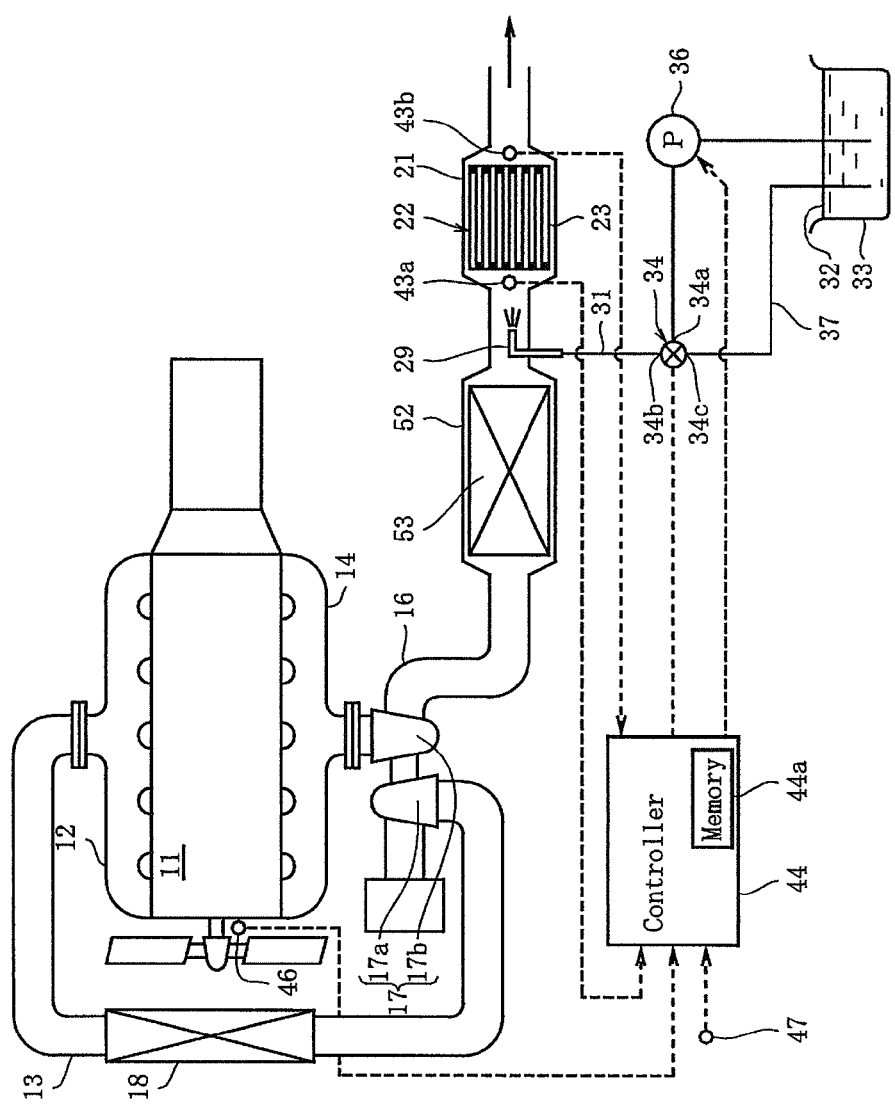
FIG. 1 is a block diagram illustrating configuration of an exhaust gas purifier according to an embodiment of the present invention.

As shown in FIG. 1, an intake pipe 13 is connected to an intake port of a diesel engine 11 through an intake manifold 12, while an exhaust pipe 16 is connected to an exhaust port through an exhaust manifold 14. At the intake pipe 13, a compressor 17a of a turbocharger 17 and an intercooler 18 for cooling an intake air compressed by the turbocharger 17 are provided, respectively, and a turbine 17b of the turbocharger 17 is provided at the exhaust pipe 16. Though not shown, a rotor blade of the compressor 17a and a rotor blade of the turbine 17b are connected by a shaft. It is configured so that the turbine 17b is rotated by energy of an exhaust gas emitted from the engine 11 and the compressor 17a through the shaft, and an intake air in the intake pipe 13 is compressed by rotation of the compressor 17a.

Though not shown, a fuel injection device is provided at the engine 11. The fuel injection device in this embodiment has an in-cylinder injector which has its tip end portion faced to a cylinder and can inject diesel oil, which is a fuel, to the cylinder, a common rail for pressure-accumulating the diesel oil inside and pressure-feeding the diesel oil to the injector, and a feed pump for supplying the diesel oil to this common rail. The in-cylinder injector is configured so that an injection amount and an injection timing of the diesel oil can be adjusted by an electromagnetic valve built in the injector. This fuel injection device is configured capable of a post-injection that diesel oil is injected into the cylinder after the piston has come to the top dead center and so as to increase or decrease hydrocarbon to be supplied to the exhaust pipe 16 from the engine depending on whether or not the post-injection is carried out. The selective reduction catalyst 22 is stored in a cylindrical converter 21 where the diameter of the exhaust pipe 16 is expanded.

Figure 2:
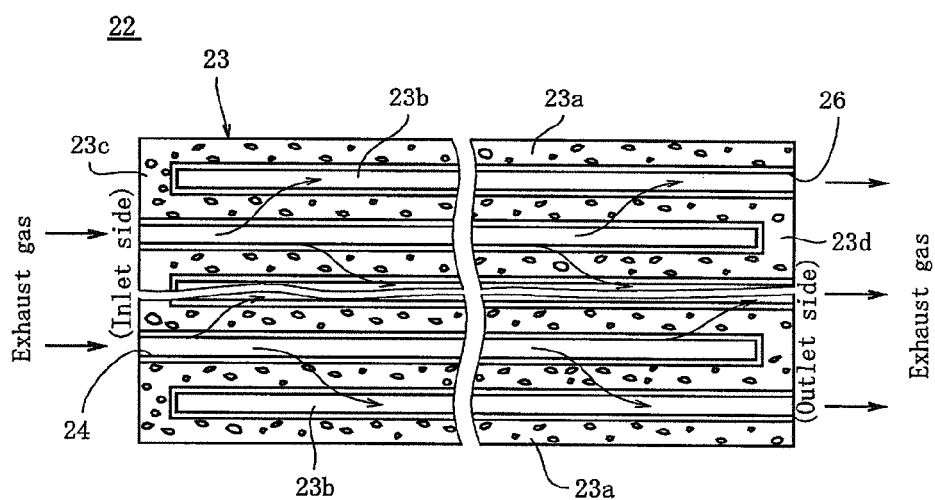
FIG. 2 is an enlarged sectional view of the selective reduction catalyst.

As shown in FIG. 2 in detail, the selective reduction catalyst 22 comprises a catalyst support 23 and a first and a second components 24, 26 having a catalytic action and carried by the catalyst support 23. The catalyst support 23 comprises a porous body made of a ceramic such as cordierite and silicon carbide or the like, and a plurality of through holes 23b partitioned by porous walls 23a are formed in parallel with each other. In this catalyst support 23, inlet portions 23c and outlet portions 23d, adjacent to each other, of the plurality of through holes 23a partitioned by the walls 23a are sealed alternately, and the walls 23a of the porous body are coated with the first active component 24 such as metal zeolite, metal alumina or the like, so that the catalyst support 23 is carried by the walls 23a. And the wall 23a is formed so as to have ventilation in the state where the first active component 24 is carried, and so that an exhaust gas flowing in the inlet portion 23c of a through hole 23b passes through the wall 23a and flows into another through hole 23b adjacent to the through hole 23b as indicated by solid line arrows, flows into another through hole 23b adjacent to the through hole 23b, and is emitted from the output portion 23d of the another through hole 23b.

The first active component 24 carried by the wall 23a is configured such that NOx in the exhaust gas from the engine 11 is dissolved through the reaction with ammonia or the urea liquid. As the first active component 24 in this embodiment, for example, zeolite, alumina or the like is employed that reduces NOx at a relatively low temperature of 200 to 300° C. On the other hand, on the inner surface of another through hole 23b into which the exhaust gas having passed the wall 23a flows, the second active component 26 is carried. The second active component 26 has a catalytic action for oxidizing ammonia having passed the wall 23a, and precious metal/zeolite, precious metal/alumina or the like is used as the second active component.

Figure 3:
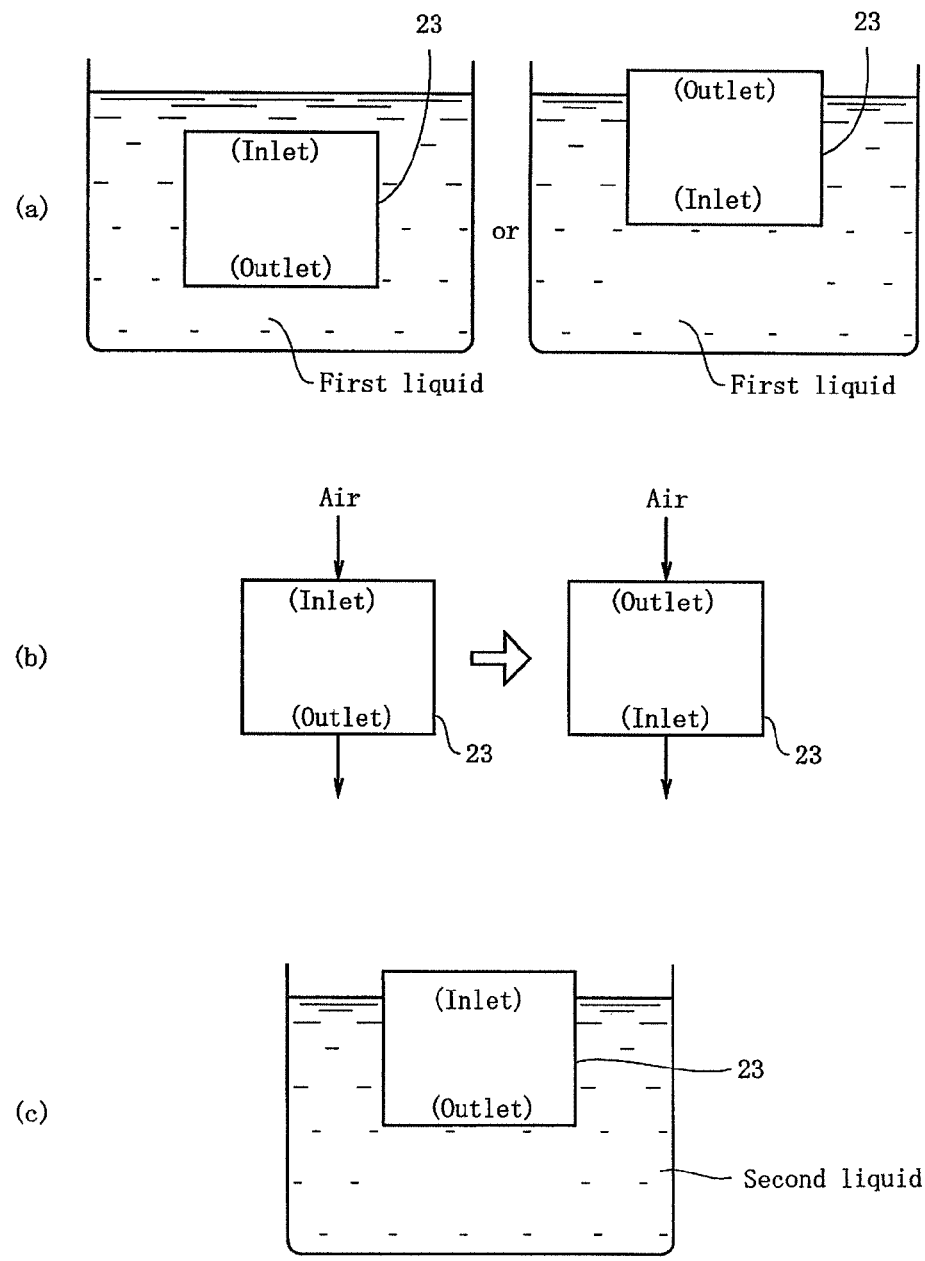
FIG. 3 is a diagram illustrating a manufacturing procedure of the selective reduction catalyst.

A specific method for manufacturing the selective reduction catalyst 22 will be described below. As shown in FIG. 3(a), the catalyst support 23 is completely dipped in a first liquid obtained by slurrying metal zeolite and metal alumina serving as the first active component 24 and then, the first liquid is brought into contact with the inner surfaces of all the through holes 23b in which about 80 to 90 percent of the inlet portion 23c or the outlet portion 23d is sealed or dipped from the inlet side to dip the catalyst support 23 in the first liquid in the longitudinal direction, and the first liquid is brought into contact with the inner surface of the through hole 23b whose outlet 23d is sealed. After that, the catalyst support 23 is raised from the first liquid and the liquid is removed, and as shown in FIG. 3(b), air is blown from the inlet side and outlet side, respectively, so as to pass the air through the wall 23a to remove the surplus first liquid and to ensure ventilation of the wall 23a. Then, as shown in FIG. 3(c), the catalyst support 23 is dipped in the second liquid in which the precious metal/zeolite, precious metal/alumina or the like serving as the second active component 26 slurried together with an organic component from the outlet side. That is, approximately 80 to 90 percent of the catalyst support 23 is dipped in the second liquid in the longitudinal direction, and without bringing the second liquid into contact with the inner surface of the through hole 23b whose outlet 23d is sealed, only the inner surfaces of all the through holes 23b in which the inlet 23c is sealed is brought into contact with the second liquid. At this time, the second liquid may be brought into contact with the inner surface of the through hole 23b in which the inlet 23c is sealed by sucking air from the inlet side. After that, the catalyst support 23 is raised and the liquid is removed again and drying/sintering allows the first and the second active components 24, 26 to be carried by the catalyst support 23, respectively. Through this sintering, the organic component in the second liquid is burned and lost, and a portion where the organic component was present becomes a space, where the ventilation of the wall 23a is ensured. In this way, the selective reduction catalyst 22 is produced in which the first and the second active components 24, 26 are carried by the catalyst support 23, respectively.

Returning to FIG. 1, at the exhaust pipe 16 on the exhaust-gas upstream side of the selective reduction catalyst 22, that is, at the inlet of the selective reduction catalyst 22, the liquid injection nozzle 29 is provided toward the selective reduction catalyst 22. One end of a liquid supply pipe 31 is connected to the liquid injection nozzle 29, while the other end of the liquid supply pipe 31 is connected to a liquid tank 33 in which the urea liquid 32 is reserved. Also, a liquid regulating valve 34 for regulating a supply amount of the liquid 32 to the liquid injection nozzle 29 is provided at the liquid supply pipe 31, and a pump 36 which can supply the liquid 32 in the liquid tank 33 into the liquid injection nozzle 29 is provided at the liquid supply pipe 31 between the liquid regulating valve 34 and the liquid tank 33. The liquid regulating valve 34 is a three-way valve having a first to a third ports 34a to 34c, in which the first port 34a is connected to a discharge port of the pump 36, the second port 34b is connected to the liquid injection nozzle 29, and the third port 34c is connected to the liquid tank 33 through a return pipe 37. And when the liquid regulating valve 34 is turned on, the first and the second ports 34a, 34b are made to communicate with each other, while when it is turned off, the first and the third ports 34a, 34c are made to communicate with each other.

On the other hand, a first and a second temperature sensors 43a, 43b for detecting an exhaust gas temperature in the exhaust pipe 16 are provided at the exhaust pipe 16. That is, at the inlet of the selective reduction catalyst 22 between the liquid injection nozzle 29 and the selective reduction catalyst 22, the first temperature sensor 43a for detecting the exhaust gas temperature in the exhaust pipe 16 at the inlet is provided. On the other hand, at the outlet of the selective reduction type catalyst 22, the second temperature sensor 43b for detecting the exhaust gas temperature in the exhaust pipe 16 at the outlet is provided. Detection outputs of the first and the second temperature sensors 43a, 43b are connected to control inputs of a controller 44 made of a microcomputer, respectively. To the other control inputs of the controller 44, each of detection outputs such as a rotation sensor 46 for detecting a rotation speed of the engine 11, a load sensor 47 for detecting a load of the engine 11 and the like is connected. The load sensor 47 detects a displacement amount of a load lever of the fuel injection pump (not shown) in this embodiment. The control output of the controller 44 is connected to the liquid regulating valve 34 and the pump 36, respectively. The controller 44 is provided with a memory 44a. The memory 44a stores ON/OFF of the liquid regulating valve 34 according to the exhaust gas temperature at the inlet and the outlet of the selective reduction catalyst 22, the engine rotation, engine load and the like, an opening degree at the time the valve is ON, and presence or absence of operation of the pump 36.

Also, the oxidation catalyst 53 is provided at the exhaust pipe 16 on the exhaust-gas upstream side of the selective reduction catalyst 22. The oxidation catalyst 53 is stored side by side in a cylindrical converter 52 where the diameter of the exhaust pipe 16 on the upstream side of the selective reduction catalyst 22 is expanded. Though not shown, the oxidation catalyst 53 has a monolith catalyst support (material: cordierite), not shown, in which passages are formed in a lattice-shaped structure (honeycomb-shaped structure) in the direction where the exhaust gas is flowing, and the monolith catalyst support is coated with platinum/zeolite catalyst or platinum/alumina catalyst. This coating provides oxidation power of soot or hydrocarbon (HC or the like) for the oxidation catalyst 53.

On the other hand, the fuel injection device, not shown, is configured capable of post-injection of the diesel oil into the cylinder. Therefore, post-injection of the diesel oil by the fuel injection device into the cylinder allows hydrocarbon to be increased in the exhaust gas and to be supplied together with the exhaust gas from the engine 11 to the exhaust pipe 16. When hydrocarbon is increased in the exhaust gas, the increased hydrocarbon is oxidized/reacted in the oxidation catalyst 53, which increases the temperature of the exhaust gas itself.

Action of the engine exhaust gas purifier constructed as above will be described below.

When the engine 11 is started, the exhaust gas travels from the exhaust manifold 14 to the exhaust pipe 16 and reaches the selective reduction catalyst 22 through the exhaust pipe 16. And the NOx in the exhaust gas is purified at the selective reduction catalyst 22. That is, the controller 44 which has determined that the temperature of the exhaust gas is relatively high from the detection outputs of the first and the second temperature sensors 43a, 43b, turns on the liquid regulating valve 34 so as to make the first and the second ports 34a, 34b at the liquid regulating valve 34 communicate with each other and injects the urea liquid 32 from the liquid injection nozzle 29. This is because a reducing agent is needed to purify NOx in the exhaust gas by the selective reduction catalyst 22, and the urea liquid 32 that has been adjusted to a predetermined concentration in advance is reserved in the liquid tank 33. The controller 44 estimates the NOx concentration in the exhaust gas from the driving state of the diesel engine 11 obtained based on each detection output of the rotation sensor 46 and the load sensor 47 and obtains an amount of urea as a reducing agent required for purifying this NOx. And the controller 44 determines a specific injection amount of the urea liquid 32 from the obtained urea amount required as the reducing agent, turns on the liquid regulating valve 34 and injects the optimal amount of the urea liquid 32 from the injection nozzle 29. The injected urea liquid is heated by the exhaust gas and hydrolyzed, so that ammonia is generated. When this ammonia flows into the selective reduction catalyst 22, NO, $NO_2$ in the exhaust gas is reduced and changed into $N_2$ or $H_2O$ in the first active component 24 carried by the catalyst support 23, and the amount of NOx emitted as it is to the atmosphere is reduced.

On the other hand, surplus ammonia ($NH_3$) having passed through the wall 23a of the catalyst support 23 without serving as a reducing agent is oxidized and changed into NOx or $H_2O$ in the second active component 26 carried by the inner surface of the through hole 23b, and emission of NOx as it is into the atmosphere is prevented. And since the second active component 26 for oxidizing the surplus ammonia is carried by the catalyst support 23, the ammonia oxidation catalyst conventionally required for oxidizing the surplus ammonia is not needed any more. As a result, as compared with the conventional case where the ammonia oxidation catalyst needs to be provided at the exhaust pipe separately from the selective reduction catalyst, a degree of freedom in design is improved, and increase of the number of mounting processes from the conventional case can be avoided since the number of required catalysts is decreased.

In the selective reduction catalyst 22 in the present invention, since the inlet portions 23c and the outlet portions 23d, adjacent to each other, of the through hole 23b in the catalyst support 23 are sealed alternately, it is necessary to avoid deposition of particulates on the wall 23a. Particularly, since ammonia is used as a reducing agent, if the temperature of the exhaust gas is relatively low, there is a possibility that ammonia nitrate or the like generated by the reaction of ammonia with NOx turns into a solid matter and is deposited on the wall 23a of the catalyst support 23. If ammonium nitrate in a particle-state solid matter is excessively deposited on the selective reduction catalyst 22, there may occur a problem that fine holes in the wall 23a of the catalyst 22 are clogged or the surface of the wall 23a is covered, which interferes with NOx purification action.

In order to avoid this, the selective reduction catalyst 22 needs to be regenerated, and the regeneration of the selective reduction catalyst 22 is carried out by post-injection of the diesel oil, which is a fuel, into the cylinder with the fuel injection device, not shown. When hydrocarbon in the exhaust gas is increased and supplied together with the exhaust gas from the engine 11 to the exhaust pipe 16, this post-injection allows hydrocarbon to be increased in the exhaust gas, and the increased hydrocarbon is oxidized/reacted in the oxidation catalyst 53 so as to raise the temperature of the exhaust gas itself. The exhaust gas whose temperature has been raised reaches the selective reduction catalyst 22 provided on the downstream side. Since the ammonium nitrate deposited on the selective reduction catalyst 22 is burned at 210° C. or above, the ammonium nitrate in the particle-state solid matter deposited on the selective reduction catalyst 22 is burned and dissolved by heat of the exhaust gas whose temperature has been raised Thus, the selective reduction catalyst 22 can be regenerated.

Figure 4:
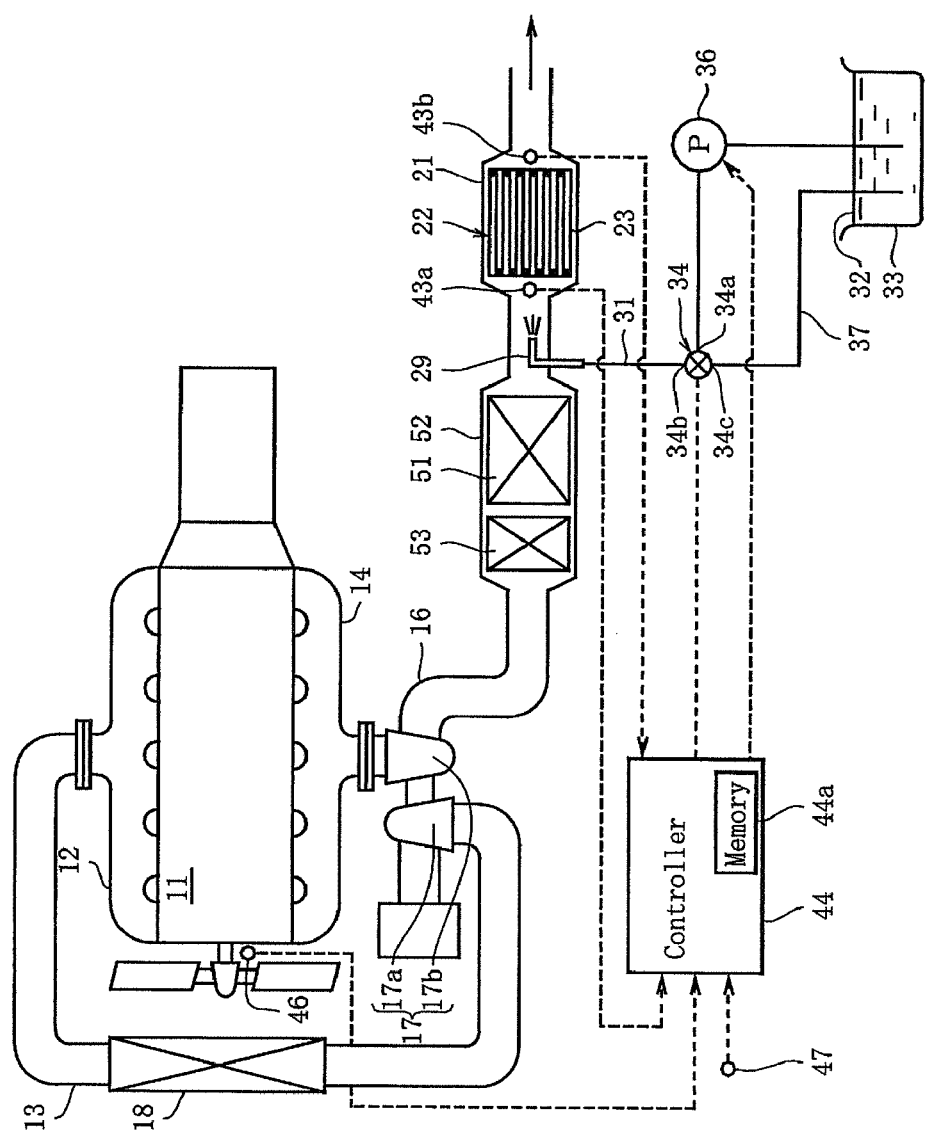
FIG. 4 is a block diagram illustrating configuration of an exhaust gas purifier according to another embodiment of the present invention.

FIG. 4 shows another embodiment of the present invention. The same reference numerals as those in the above mentioned figures refer to the same parts, and repeated description will be omitted.

As shown in FIG. 4, in this embodiment, the diesel particulate filter 51 made of a porous ceramic is provided at the exhaust pipe 16 on the exhaust-gas upstream side of the selective reduction catalyst 22, and the oxidation catalyst 53 is further provided on the upstream side of the filter 51. The diesel particulate filter 51 and the oxidation catalyst 53 are stored side by side in the cylindrical converter 52 where the diameter of the exhaust pipe 16 on the upstream side of the selective reduction catalyst 22 is expanded. Though not shown, the particulate filter 51 is in a honeycomb-shaped structure in which a first passage plugged at the upstream side and a second passage plugged at the downstream side are arranged alternately and is configured so that the exhaust gas passes from the second passage through the flow passage wall surface of porous ceramic and flows to the downstream side through the first passage. And the particulates in the exhaust gas are caught by the porous ceramic and emission of the particulates into the atmosphere is prevented. On the other hand, since the oxidation catalyst 53 is the same part as that in the above-embodiment, repeated description will be omitted.

And a filter temperature raising means configured capable of raising the temperature of the diesel particulate filter 51 to a predetermined value is provided. The filter temperature raising means in this embodiment comprises the above-mentioned oxidation catalyst 53 and the fuel injection device, not shown. That is, post-injection of the diesel oil with the fuel injection device into the cylinder allows hydrocarbon to be increased in the exhaust gas and supplied together with the exhaust gas from the engine 11 to the exhaust pipe 16. When hydrocarbon is increased in the exhaust gas, the increased hydrocarbon is oxidized/reacted in the oxidation catalyst 53, which increases the temperature of the exhaust gas itself, and the temperature of the diesel particulate filter 51 located on the downstream side is raised to the predetermined value.

Action of the engine exhaust gas purifier constructed as above will be described below.

When the engine 11 is started, the exhaust gas travels from the exhaust manifold 14 to the exhaust pipe 16 and reaches the diesel particulate filter 51 through the exhaust pipe 16. The particulates in the exhaust gas from the diesel engine 11 are caught by the diesel particulate filter 51. And the exhaust gas in which the particulates are caught and removed passes through the particulate filter 51 and reaches the selective reduction catalyst 22 located on the downstream side. And NOx in the exhaust gas is purified at the selective reduction catalyst 22.

That is, the controller 44 which has determined that the temperature of the exhaust gas is relatively high from the detection outputs of the first and the second temperature sensors 43a, 43b, turns on the liquid regulating valve 34 so as to make the first and the second ports 34a, 34b at the liquid regulating valve 34 communicate with each other and injects the urea liquid 32 from the liquid injection nozzle 29. This is because a reducing agent is needed to purify NOx in the exhaust gas by the selective reduction catalyst 22, and the urea liquid 32 adjusted to a predetermined concentration in advance is reserved in the liquid tank 33. The controller 44 estimates the NOx concentration in the exhaust gas from the driving state of the diesel engine 11 obtained based on each detection output of the rotation sensor 46 and the load sensor 47 and obtains an amount of urea as a reducing agent required for purifying this NOx. Also, the controller 44 determines a specific injection amount of the urea liquid 32 from the acquired urea amount required as the reducing agent, turns on the liquid regulating valve 34 and injects the optimal amount of the urea liquid 32 from the injection nozzle 29. The injected urea liquid is heated by the exhaust gas and hydrolyzed, so that ammonia is generated. When this ammonia flows into the selective reduction catalyst 22, NO, $NO_2$ in the exhaust gas is reduced and changed to $N_2$ or $H_2O$ in the first active component 24 carried by the catalyst support 23, and the amount of NOx emitted as it is into the atmosphere is reduced.

On the other hand, the surplus ammonia ($NH_3$) having passed the wall 23a of the catalyst support 23 without serving as a reducing agent is oxidized at the second active component 26 carried by the inner surface of the through hole 23b after passing through the wall 23a and changed to NOx or $H_2O$, and emission of ammonia as it is to the atmosphere is prevented. Since the second active component 26 oxidizing the surplus ammonia is carried by the catalyst support 23, the conventional ammonia oxidation catalyst required for oxidizing the surplus ammonia is not needed any more. As a result, as compared with the conventional case where the ammonia oxidation catalyst needs to be provided at the exhaust passage separately from the selective reduction catalyst, a degree of freedom in design is improved and the number of required catalysts is reduced, so that increase of the number of mounting processes from the conventional case can be avoided.

In the selective reduction catalyst 22 in the present invention, since the inlet portions 23c and the outlet portions 23d, adjacent to each other, of the through hole 23b in the catalyst support 23 are alternately sealed, there is a need to avoid deposition of particulates on the wall 23a. Particularly, since ammonia is used as a reducing agent, if the temperature of an exhaust gas is relatively low, ammonium nitrate generated by the reaction of ammonia with NOx might turn into a solid matter and is deposited on the wall 23a of the catalyst support 23. If ammonium nitrate, which is a particle-state solid matter, is excessively deposited on the selective reduction catalyst 22, there might occur a problem that fine holes in the wall 23a of the catalyst 22 are clogged or the surface of the wall 23a is covered, which interferes with NOx purification reaction. Even though the diesel particulate filter 51 is provided on the upstream side of the selective reduction catalyst 22, when the amount of particulates caught by the diesel particulate filter 51 is increased, flow passage resistance of the exhaust passing through the particulate filter 51 is also increased. Thus, the selective reduction catalyst 22 and the diesel particulate filter 51 provided on the upstream side need to be regularly regenerated. The regenerating method will be described below.

Regeneration of the selective reduction catalyst 22 is carried out together with regeneration of the particulate filter 51. And the regeneration of the particulate filter 51 is carried out by post-injection of the diesel oil, which is a fuel, into the cylinder by the fuel injection device, not shown, which is the filter temperature raising means. This post-injection allows hydrocarbon in the exhaust gas to be increased and supplied together with the exhaust gas from the engine 11 to the exhaust pipe 16. If hydrocarbon is increased in the exhaust gas, the increased hydrocarbon is oxidized/reacted in the oxidation catalyst 53 so as to raise the temperature of the exhaust gas itself and also to raise the temperature of the diesel particulate filter 51 located on the downstream side. When the temperature of the particulate filter 51 is raised and the temperature of the particulates exceeds a temperature at which the particulates can be burned, for example, 600° C., the particulates caught by the particulate filter 51 is burned by the heat, so that the particulate filter 51 is regenerated.

When the temperature of the particulate filter 51 is raised and the particulates are burned, the temperature of the exhaust gas having passed through the particulate filter 51 is extremely raised, and the exhaust gas whose temperature has been raised reaches the selective reduction catalyst 22 provided on the downstream side. On the other hand, ammonium nitrate deposited on the selective reduction catalyst 22 is burned at 210° C. or above, and ammonium nitrate, which is a particle-state solid matter, deposited on the selective reduction catalyst 22 is burned and dissolved by the heat of the exhaust gas whose temperature has been raised. Thus, the selective reduction catalyst 22 can be regenerated.

In the above-mentioned embodiment, a diesel engine with turbocharger is exemplified as an engine, but the exhaust gas purifier of the present invention may be used in a natural aspirated diesel engine.

Also, in the above-mentioned embodiment, a fuel injection device capable of post-injection is described as a filter temperature raising means, but the filter temperature raising means may be anything that can raise the temperature of the filter by raising the exhaust gas temperature. For example, a means may be used which increases an engine load by closing an EGR control valve, an intake throttle valve or an exhaust brake valve or by increasing a nozzle-vane opening degree of a variable geometry (VG) turbo, or which has a nozzle capable of injecting hydrocarbon may be provided directly toward the filter immediately before the filter.

What is claimed is:

1. An engine exhaust gas purifier comprising:
 a selective reduction catalyst, provided at an exhaust pipe of the diesel engine;

a liquid injection nozzle which is provided at the exhaust pipe on the exhaust-gas upstream side of the selective reduction catalyst and can inject urea liquid toward the selective reduction catalyst; and an oxidation catalyst provided at the exhaust pipe on the exhaust-gas upstream, side of the selective reduction catalyst, wherein the selective reduction catalyst comprises a catalyst support in which a plurality of through holes are formed and partitioned by porous walls parallel to each other, the parallel porous walls carrying a first active component including metal zeolite or metal alumina, having a catalytic action, in which nitrogen oxide in an exhaust gas from an engine is reacted with ammonia for dissolution, wherein an inlet and an outlet, adjacent to each other, of the plurality of through holes partitioned by the parallel porous walls are sealed alternately;

the parallel porous walls carrying the first active component have ventilation for the exhaust gas including ammonia and dissolved gas of nitrogen oxide and are formed so that the exhaust gas flowing in the inlet of a first through hole passes through the parallel porous walls and is emitted from the outlet of another through hole adjacent to the first through hole;

a second active component including precious metal/zeolite or precious metal/alumina, having a catalytic action so as to oxidize ammonia having passed through the parallel porous walls is carried on the inner surface of the another through hole;

the first and second active compounds are carried on the inner surfaces of all the through holes in 80 to 90 percent of the through holes in the longitudinal direction;

the parallel porous walls carrying the first active component is formed so that ammonium nitrate in the particle-state of solid matter cannot pass through the parallel porous walls; and the ammonium nitrate deposited on the parallel porous walls is configured so as to be dissolved and pass through the parallel porous walls by heat of the exhaust gas whose temperature has been raised to a temperature of 210° C. or above by oxidation reaction in the oxidation catalyst, so that the selective reduction catalyst can be regenerated.

2. An engine exhaust gas purifier comprising:

a selective reduction catalyst provided at an exhaust pipe of the diesel engine;

a liquid injection nozzle which is provided at the exhaust pipe on the exhaust-gas upstream side of the selective reduction catalyst and can inject urea liquid toward the selective reduction catalyst;

a diesel particulate filter provided at the exhaust pipe on the exhaust-gas upstream side of the selective reduction catalyst; and filter temperature raising means configured capable of raising the temperature of the diesel particulate filter to a temperature of 600° C. or above, wherein the selective reduction catalyst comprises a catalyst support in which a plurality of through holes are formed and partitioned by porous walls parallel to each other, the parallel porous walls carrying a first active component including metal zeolite or metal alumina, having a catalytic action, in which nitrogen oxide in an exhaust gas from an engine is reacted with ammonia for dissolution, wherein an inlet and an outlet, adjacent to each other, of the plurality of through holes partitioned by the parallel porous walls are sealed alternately;

the parallel porous walls carrying the first active component have ventilation for the exhaust gas including ammonia and dissolved gas of nitrogen oxide and are formed so that the exhaust gas flowing in the inlet of a first through hole passes through the parallel porous walls and is emitted from the outlet of another through hole adjacent to the first through hole;

a second active component including precious metal/zeolite or precious metal/alumina, having a catalytic action so as to oxidize ammonia having passed through the parallel porous walls is carried on the inner surface of the another through hole;

the parallel porous walls carrying the first active component is formed so that ammonium nitrate in the particle-state of solid matter cannot pass through the parallel porous walls; and the ammonium nitrate deposited on the parallel porous walls component is configured so as to be dissolved and pass through the parallel porous walls by heat of the exhaust gas whose temperature has been raised to a temperature of 600° C. or above by said filter temperature raising means, so that the selective reduction catalyst can be regenerated.

* * * * *